June 17, 1947.  R. G. LE TOURNEAU  2,422,357
FEED SPEED CONTROL MEANS FOR HYDRAULICALLY OPERATED MACHINE TOOLS
Filed Jan. 22, 1944  4 Sheets-Sheet 1

Inventor
R. G. LeTourneau
Attorneys

June 17, 1947. R. G. LE TOURNEAU 2,422,357
FEED SPEED CONTROL MEANS FOR HYDRAULICALLY OPERATED MACHINE TOOLS
Filed Jan. 22, 1944 4 Sheets-Sheet 3

Inventor
R. G. LeTourneau
By
Webster & Webster
Attorneys

Inventor
R. G. LeTourneau

Patented June 17, 1947

2,422,357

UNITED STATES PATENT OFFICE 2,422,357

FEED SPEED CONTROL MEANS FOR HYDRAULICALLY OPERATED MACHINE TOOLS

Robert G. Le Tourneau, Peoria, Ill., assignor to R. G. Le Tourneau, Inc., Stockton, Calif., a corporation of California Application January 22, 1944, Serial No. 519,326

2 Claims. (Cl. 121—45)

This invention is directed in general to improvements in lathes, and in particular relates to a novel lathe carriage operating mechanism.

One of the objects of the invention is to operate the lathe carriage by means of a double acting power cylinder or ram; there being a liquid pressure control system associated with said power cylinder arranged to operate said cylinder to effect an initial relatively fast advancing feed of the carriage followed, automatically, by a relatively slow advancing feed upon the tool approaching and engaging the work, and to effect a relatively fast return feed of the carriage from its point of greatest advance to its retracted or starting point.

Another object is to embody in the liquid pressure control system of a lathe carriage operating mechanism, as above, a manually controlled valve operative, selectively, to cause energization of the power cylinder to advance or retract the carriage; and another valve adjustable to regulate the maximum speed at which the power cylinder can advance and retract the carriage.

A further object is to provide, in combination with a lathe having a movable carriage, a double-acting power cylinder connected in operating relation to the carriage, and a liquid pressure control system connected to said cylinder and including a manual reversing valve and another valve arranged to control the speed of advancing feed of the carriage; said other valve at the beginning of each cycle being in a predetermined open position to provide relatively fast initial advance of the carriage, and carriage controlled means arranged to cause a partial closing of said other valve and reduced advancing speed of the carriage as the tools approach the work.

It is also an object of the invention to provide a lathe in which the carriage is mainly laterally offset from the longitudinal axis of the lathe to facilitate connection of the power actuating mechanism to said carriage, and in which lathe the tailstock, preferably power operated, is supported by a laterally offset base to permit of convenient and compact mounting of the power cylinder, which said mechanism includes.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
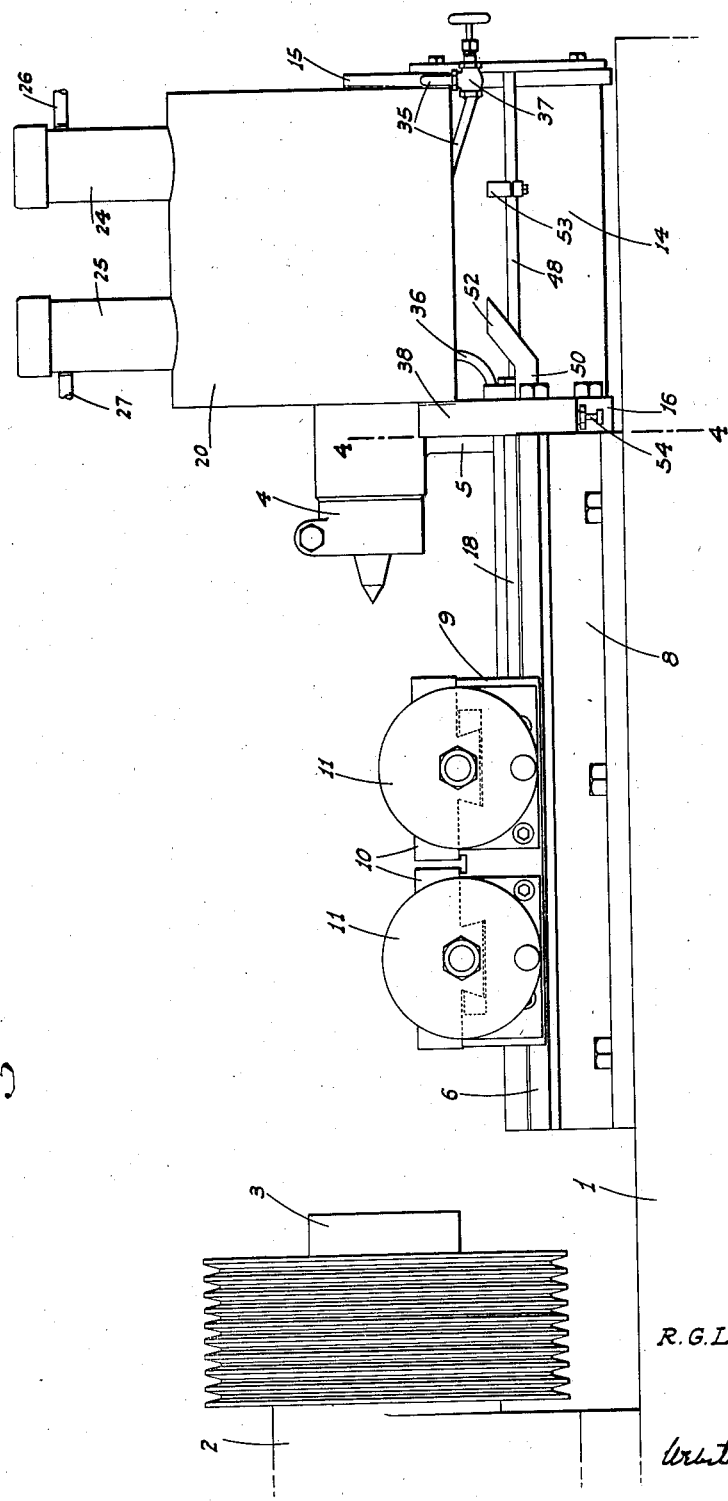
Figure 1 is a side elevation of a lathe embodying the invention.
Figure 2:
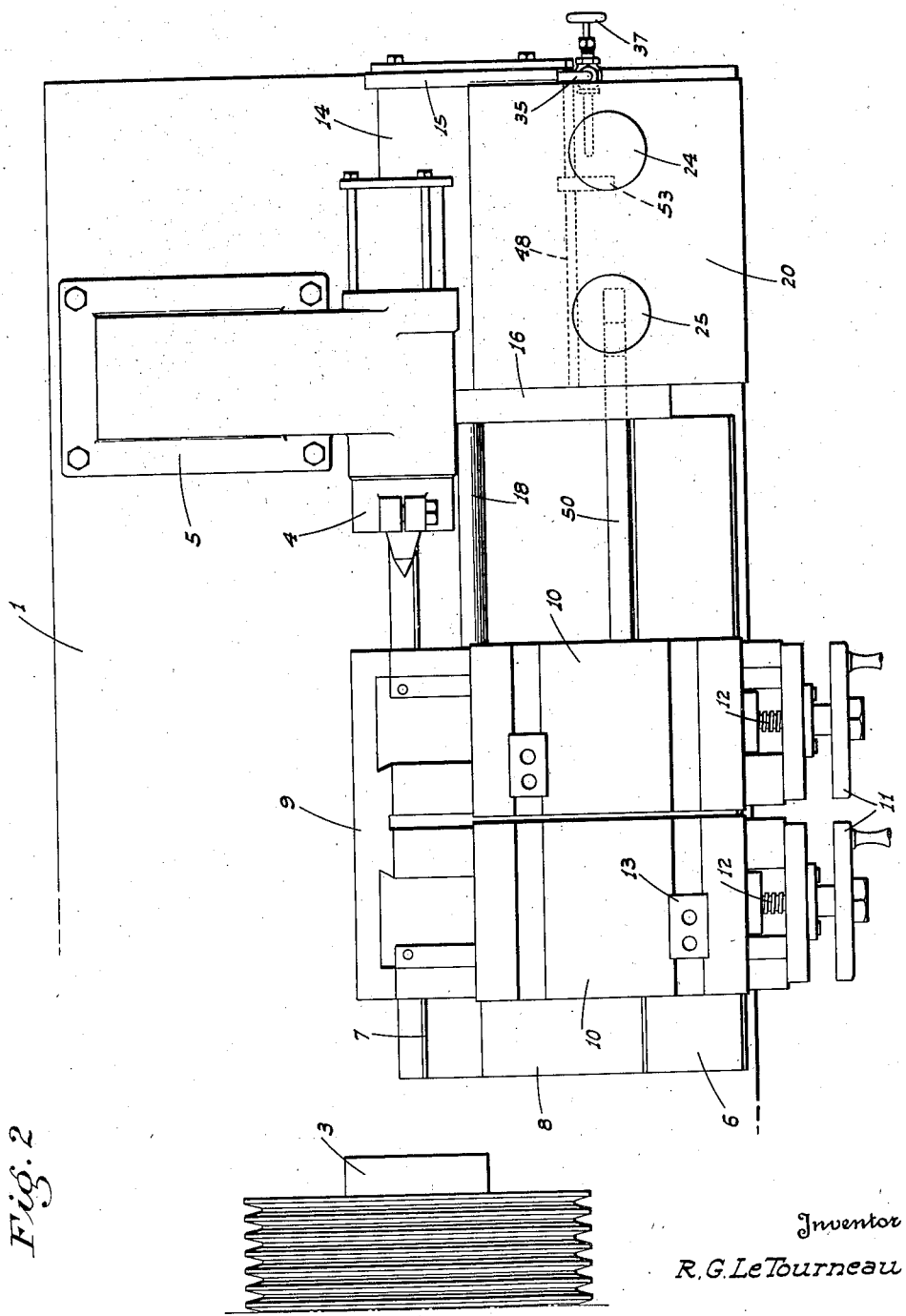
Figure 2 is a plan view of the same.
Figure 3:
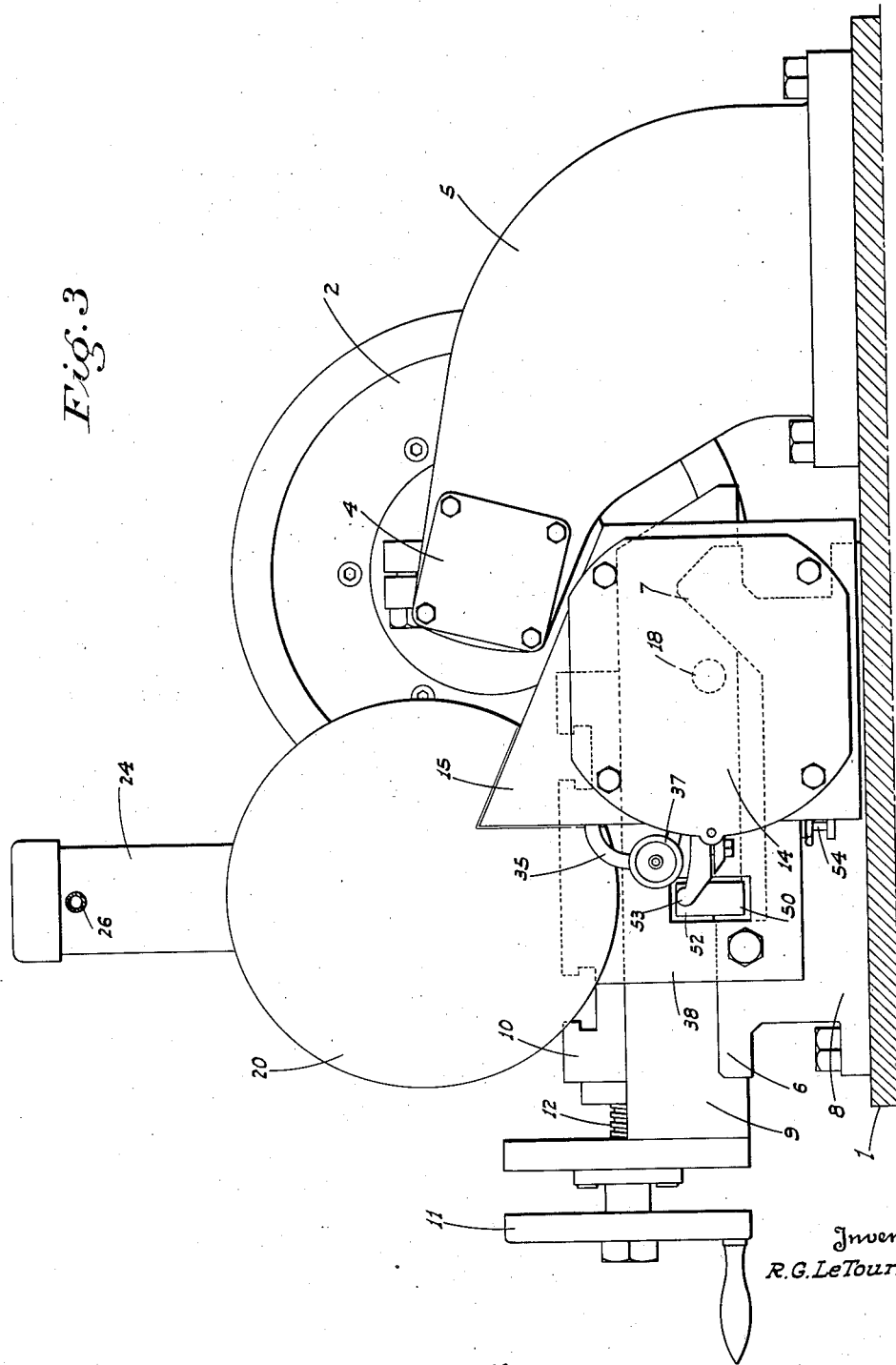
Figure 3 is an end view of the lathe, looking toward the outer end of the tailstock and the carriage operating mechanism.

Referring now more particularly to the characters of reference on the drawings, the lathe comprises a bed 1 upon which is mounted a power driven headstock 2 which includes a chuck 3, and a tailstock 4, preferably of fluid pressure actuated type, is supported in alinement with the headstock 2 by means of a laterally offset base 5, secured on bed 1.

Parallel, transversely spaced ways 6 and 7, formed in integral relation on a base 8 which is secured to the bed 1, are disposed mainly laterally offset from the lathe axis and to the side opposite tailstock base 5.

A carriage 9 is slidable longitudinally of the lathe on the ways 6 and 7, and includes one or more tool supporting cross slides 10 controlled by hand wheels 11 and screws 12; the tool holder for each cross slide being shown at 13.

A fluid pressure actuated, double acting power cylinder 14 is disposed horizontally and longitudinally adjacent, and partially overhung by the tailstock 4; such cylinder including heads 15 and 16, a piston 17, and a piston rod 18 which extends through head 16 to connection with the adjacent end of carriage 9. It will be seen that upon movement of the piston 17, the rod 18 and carriage 9 will be correspondingly moved.

The fluid pressure system employed to operate and control the power cylinder 14 comprises the following:

A cylindrical tank 20 is mounted above the cylinder 14 in parallel relation but slightly outwardly offset, and is supported by projecting portions of the cylinder heads 15 and 16; such tank being divided between its ends by a vertical wall 21 to form separate chambers 22 and 23. Air domes 24 and 25 are mounted on top of tank 20 and communicate with chambers 22 and 23 respectively. Conduits 26 and 27 lead from opposed ports 28 and 29 of a manually operated four-way valve 30; the intake port 31 of said valve being connected to an air pressure-supply pipe 32, while the exhaust port 33 leads to atmosphere, as at 34. By manipulation of valve 30, air pressure can be fed to either dome and simultaneously released from the other.

Figure 5:
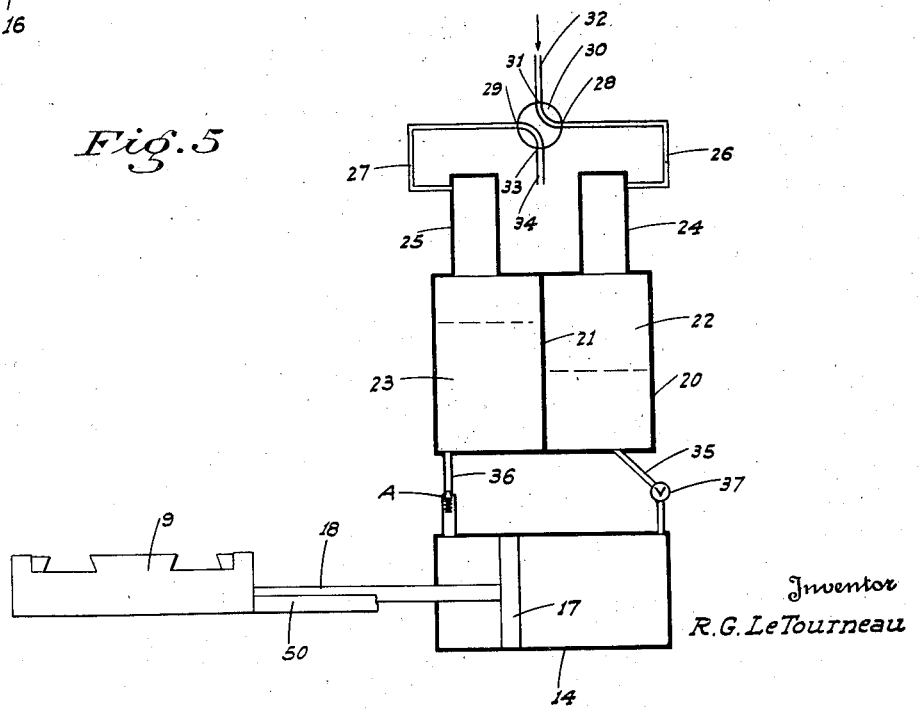
Figure 5 is a diagram of the fluid pressure control system as arranged with the carriage operating power cylinder.

The chambers 22 and 23 are partially filled with a cylinder operating liquid, such as oil, and such liquid is fed between said chambers and corresponding ends of the cylinder 14 by pipes 35 and 36 which lead from the chambers to cylinder heads 15 and 16 respectively; said heads being passaged to provide communication between the pipes and the adjacent interior portions of cylinder 14, the passage in head 16 having a unique valve arrangement therein, indicated generally at A in Fig. 5, and as will hereinafter be described in detail. The pipe 35 has a hand valve 37 interposed therein.

Figure 4:
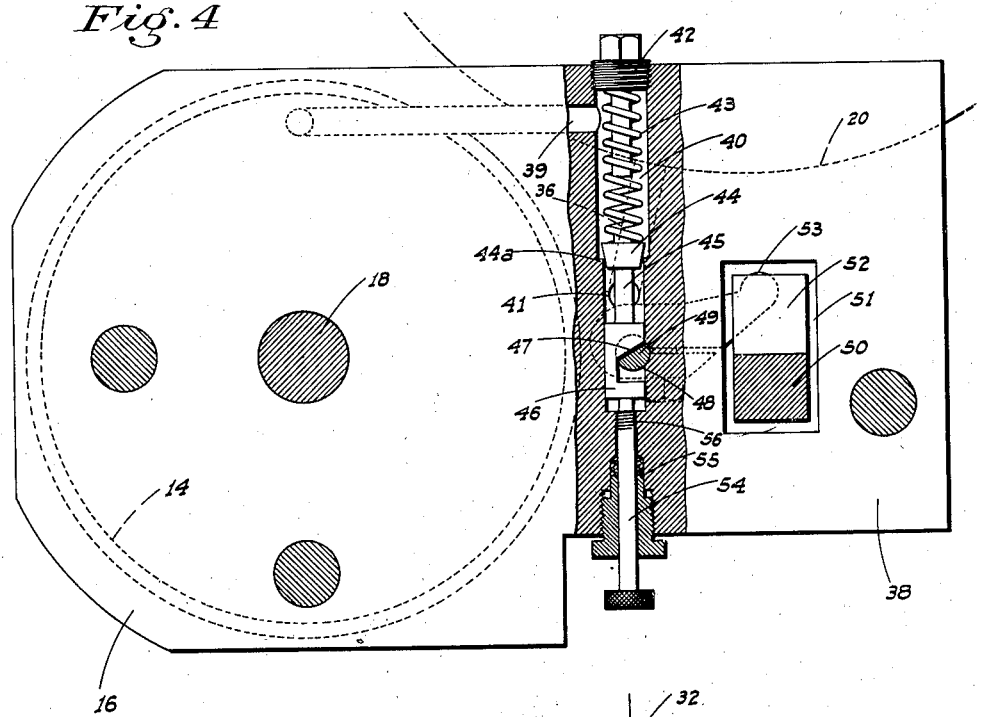
Figure 4 is an enlarged fragmentary cross section, partly broken away, on line 4—4 of Fig. 1.

The head 16 of cylinder 14 is extended laterally out some distance, as at 38, as clearly shown in Fig. 4; the liquid passage 39 in said head, which communicates between pipe 36 and the adjacent interior portion of the cylinder at the top, including a vertical, downwardly extending leg 40 in head extension 38, the pipe 36 connecting into said leg intermediate its ends at 41.

The leg 40 of passage 39 is closed at its upper end by a plug 42, and said plug retains a compression spring 43 which urges a taper poppet valve 44 toward a valve seat 44a in leg 40 above pipe connection 41, whereby the valve tends to close in the same direction as liquid would flow from the corresponding end of cylinder 14 to tank chamber 23.

The valve 44 includes a depending stem 45 formed with a cylindrical head 46 on its lower end, said head being notched to provide a flat cam face 47 which intersects the axis of said head and at an angle to its radial plane.

A control rod 48 is disposed alongside the cylinder 14 and is rotatably supported at its ends in heads 15 and 16; said rod projecting into head 16 and being formed as a cam 49 matching and cooperating with cam face 47, whereby upon predetermined rotation of rod 48 the valve 44 is raised relative to seat 44a. As the spring 43 tends to close valve 44, the cam face 47 acts on cam 49, tending to rotate the rod to the position where valve 44 is in its lowermost or closed position.

A horizontal control bar 50 is fixed on the carriage and slidably projects at 51 through the head extension 38, and therebeyond is fitted with an angularly disposed cam 52 arranged upon partial retraction of the carriage from full advancement to engage and depress a laterally projecting finger 53 longitudinally adjustably mounted on rod 48; the finger when so depressed riding on the under side of bar 50 with continued retraction of the carriage. When the finger is thus depressed, rod 48 has been rotated in a direction to raise valve 44 from its lowermost position and to a relatively wide open position.

A finger screw 54, axially alined with and below the valve 44, extends through a packing gland 55 in extension 38 and abuts against the lower end of head 46; such screw being threaded into its bore as at 56 whereby to provide a means to adjust the lowermost position of said head and consequently the valve 44.

Operation

When the work has been chucked in the lathe and the tools properly set on the cross slides 10 of the initially retracted carriage 9, the operator manipulates four-way valve 30 to feed air pressure into chamber 22 and to completely release pressure from chamber 23. When this occurs, the piston 17 begins to advance in cylinder 14, resulting in advance of the carriage.

At the outset this advancing movement is relatively rapid, as valve 44 is held relatively wide open by the carriage controlled rod and cam assembly, permitting relatively fast escape of liquid from cylinder 14 through pipe 36 into chamber 23.

However, just before the tools reach the work, the cam 52 escapes from finger 53 and valve 44 closes to the lower most position permitted by the adjustment of screw 54. This causes a substantial reduction in flow from the cylinder to pipe 36 and chamber 23, reducing the speed of advance of the carriage as is desired when the tools engage the work.

To retract the carriage, the operator reverses valve 30 to apply pressure to chamber 23 and exhaust it from chamber 22, which results in reverse movement of piston 17, and relatively rapidly as valve 44 is then raised from its seat and away from cam 49 by the flow of liquid toward pipe 36 and chamber 23.

The above cycle is repeated for each pass of the tools over the work.

The adjustable hand valve 37 is useful, as is evident, to control the maximum rate of advance and retraction of the carriage.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An operating mechanism for a lathe carriage, comprising a double acting power cylinder, means connecting the cylinder in operative relation to the carriage, and a valve controlled fluid pressure system arranged in communication with the cylinder to actuate the latter and advance or retract the carriage, selectively; said system comprising a pair of conduits leading to and connected in communication with opposite ends of the cylinder, valve controlled means to feed fluid pressure to one conduit and simultaneously and proportionately relieve fluid pressure from the other conduit, a poppet valve and seat assembly in the one of said conduits through which the direction of flow is away from the cylinder when the same is operated to advance the carriage, said valve closing in the same direction, manually adjustable means operative to limit movement of said valve in a closing direction; a turnable rod mounted parallel to the direction of movement of the carriage, said rod, upon predetermined turning in one direction, being operative to effect said predetermined opening of the poppet valve, a finger mounted in connection with and projecting laterally from the rod, a cam member movable with the carriage, said cam member engaging said finger and turning the rod in said one direction when the carriage is retracted and during said initial portion of its advance.

2. An operating mechanism for a lathe carriage, comprising a double acting power cylinder mounted on the lathe beyond one end of the carriage, the cylinder including a projecting piston rod connected to said carriage, and a valve controlled fluid pressure system arranged in communication with the cylinder to actuate the latter and advance or retract the carriage, selectively, said system including separate conduits leading to and communicating with opposite ends of the cylinder, means to feed fluid pressure to one conduit and simultaneously and proportionately relieve fluid pressure from the other conduit, the cylinder having heads and said one conduit including a passage in the corresponding head, a poppet valve and seat assembly in said passage, said poppet valve closing in a direction away from the cylinder, means limiting closing movement of said valve, a turnable rod extending alongside the cylinder, said corresponding head being extended laterally of the cylinder and the adjacent end of the rod projecting into said passage adjacent the poppet valve, cam means between said end of the rod and poppet valve operative to effect predetermined opening of the latter upon predetermined turning movement of the rod in one direction, a slide bar fixed in connection with the carriage and slidably projecting through the laterally extended portion of said corresponding head parallel to and adjacent the rod, a cam on the bar adjacent the rod, and a finger mounted on and projecting laterally from the rod in the path of said cam, said cam and bar being operative to engage said finger and effect said predetermined turning movement of the rod when the carriage is retracted and during an initial predetermined portion of its advance.

ROBERT G. LE TOURNEAU.

REFERENCES CITED

The following references are of record in the file of this patent:

UNITED STATES PATENTS

| Number | Name | Date |
|---|---|---|
| 637,461 | Hartness | Nov. 21, 1899 |
| 706,688 | Reynders | Aug. 12, 1902 |
| 863,681 | Warner | Aug. 20, 1907 |
| 891,795 | Clarke | June 23, 1908 |
| 1,147,436 | Ragonnet | July 20, 1915 |
| 1,431,248 | Norris | Oct. 10, 1922 |
| 1,599,199 | Bayles | Sept. 7, 1926 |
| 1,812,533 | Hunt | June 30, 1931 |
| 1,920,596 | Shafer | Aug. 1, 1933 |
| 2,008,013 | Foster | July 16, 1935 |
| 2,133,170 | Johnson | Oct. 11, 1938 |
| 2,360,070 | Meyerbach | Oct. 10, 1944 |